United States Patent
Bunnell et al.

(10) Patent No.: US 12,328,416 B2
(45) Date of Patent: Jun. 10, 2025

(54) METHOD FOR REROUTING COMMUNICATION IN A UNIFIED COMMUNICATIONS NETWORK

(71) Applicant: Nuwave Communications, Inc., Las Vegas, NV (US)

(72) Inventors: Mark Bunnell, Henderson, NV (US); Dorn Bhechsonggram, Claremont, CA (US); Shing Wo Chan, Rosemead, CA (US); Kyle Thomas, Three Bridges, NJ (US); Robbie Green, Spring Hill, FL (US)

(73) Assignee: Nuwave Communications, Inc., Las Vegas, NV (US)

( * ) Notice: Subject to any disclaimer, the term of this patent is extended or adjusted under 35 U.S.C. 154(b) by 81 days.

(21) Appl. No.: 18/369,719

(22) Filed: Sep. 18, 2023

(65) Prior Publication Data
US 2025/0097351 A1 Mar. 20, 2025

(51) Int. Cl.
*H04L 51/56* (2022.01)
*H04L 65/1033* (2022.01)
(Continued)

(52) U.S. Cl.
CPC .......... *H04M 3/58* (2013.01); *H04L 65/1045* (2022.05); *H04L 65/1046* (2013.01);
(Continued)

(58) Field of Classification Search
CPC . H04L 51/56; H04L 65/1033; H04L 65/1036; H04L 65/1045; H04L 65/1046;
(Continued)

(56) References Cited

U.S. PATENT DOCUMENTS

2006/0245574 A1  11/2006  Phelps et al.
2008/0259918 A1*  10/2008  Walker ................ H04L 65/1076
                                                                370/389

(Continued)

OTHER PUBLICATIONS

PCT International Search Report and Written Opinion dated Dec. 5, 2024, PCT International Application No. PCT/US2024/047124, pp. 1-12.

*Primary Examiner* — Harry S Hong
(74) *Attorney, Agent, or Firm* — Resolute Legal PLLC

(57) ABSTRACT

A method for rerouting communication in a unified communications network is disclosed. The method includes receiving an inbound call at a first session border controller and determining a redirect number mapped to the inbound call number. The inbound call can be routed to a first call destination based on the redirect number. During the inbound call, a transfer request may be received from a server associated with the first call destination, and a new destination number may be determined for transferring the inbound call. An out-of-band transfer request may be transmitted to one or more servers maintaining the inbound call, and one or more connections associated with the inbound call to the first call destination may be dropped based on the out-of-band transfer request. The inbound call may then be rerouted to a second call destination based on the new destination number identified in the out-of-band transfer request.

10 Claims, 8 Drawing Sheets

(51) Int. Cl.

| | |
|---|---|
| *H04L 65/1045* | (2022.01) |
| *H04L 65/1046* | (2022.01) |
| *H04L 65/1096* | (2022.01) |
| *H04L 65/1101* | (2022.01) |
| *H04L 67/63* | (2022.01) |
| *H04M 3/42* | (2006.01) |
| *H04M 3/51* | (2006.01) |
| *H04M 3/523* | (2006.01) |
| *H04M 3/58* | (2006.01) |
| *H04W 76/00* | (2018.01) |

(52) U.S. Cl.
CPC ...... *H04L 65/1096* (2013.01); *H04M 3/5191* (2013.01); *H04M 3/5235* (2013.01)

(58) Field of Classification Search
CPC . H04L 65/1096; H04L 65/1101; H04L 67/63; H04W 76/00; H04M 3/42; H04M 3/42314; H04M 3/5191; H04M 3/5235; H04M 3/58
USPC .................................. 379/212.01, 229, 230
See application file for complete search history.

(56) References Cited

U.S. PATENT DOCUMENTS

| | | |
|---|---|---|
| 2011/0069827 A1 | 3/2011 | Desai et al. |
| 2014/0019626 A1* | 1/2014 | Hubler .................... H04L 67/54 |
| | | 709/227 |
| 2022/0247600 A1* | 8/2022 | Anderson ........... H04L 65/1053 |
| 2022/0247860 A1 | 8/2022 | Anderson et al. |

\* cited by examiner

METHOD FOR REROUTING COMMUNICATION IN A UNIFIED COMMUNICATIONS NETWORK

FIELD OF THE DISCLOSURE

The present disclosure relates to the technical field of unified communications (UC) networks which involve an integration of enterprise communication services such as instant messaging (chat), voice services (including IP telephony), audio and video conferencing and desktop sharing. More specifically, the present disclosure relates to a system and method of transferring or rerouting a call at an endpoint that is unable to transfer the call.

BACKGROUND

In a unified communications network, it may be necessary to reroute communication during an ongoing call. For example, a call may need to be transferred to a different destination due to a change in circumstances or a need to escalate the call to a higher level of support. In such cases, it may be desirable to reroute the call without interrupting the call or causing any disruption to the communication.

Existing methods for rerouting communication may involve complex call forwarding rules or require manual intervention, which may be time-consuming and prone to errors. In some situations, call endpoints do not have the capability to redirect or forward calls. Accordingly, there is a need for a method for rerouting communication in a unified communications network that is efficient, reliable, and minimizes disruption to the communication.

BRIEF SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

According to some implementations of the present disclosure, call transfer functions can be hosted in a transfer server (or other suitable system) for use in conjunction with a communications network, such as a UC network. The call transfer functions can be used to reroute or transfer communication traffic (e.g., voice calls, video calls, SIP traffic, etc.) to reach different endpoints (e.g., desk phone, computer, mobile phone, etc.) over a communications network. For example, the call transfer functions can be used when a call is desired to be to transferred to a different call destination than was used to initially set up the call between two endpoints.

In some aspects, the techniques described herein relate to a method for rerouting communication in a unified communications network, the method including: receiving an inbound call at a first session border controller; determining, at a redirect server, a redirect number mapped to an inbound call number associated with the inbound call; routing the inbound call to a first call destination based on the redirect number, wherein routing the inbound call to the first call destination includes: opening a first call connection leg from the first session border controller to a proxy server for the inbound call; opening a second call connection leg from the proxy server to a second session border controller for the inbound call; and opening a third call connection leg from the second session border controller to a call destination server for an outbound call based on the redirect number to terminate the inbound call at the first call destination; receiving, at a transfer server, a transfer request from a server associated with the first call destination during the inbound call; determining, at the transfer server, a new destination number for transferring the inbound call; transmitting, from the transfer server, an out-of-band transfer request to one or more servers maintaining the inbound call; dropping one or more connections associated with the inbound call to the first call destination based on the out-of-band transfer request; and rerouting, at the first session border controller, the inbound call to a second call destination based on the new destination number identified in the out-of-band transfer request.

In some aspects, the techniques described herein relate to a method, wherein the transfer request is an out of band signaling message from the inbound call.

In some aspects, the techniques described herein relate to a method, wherein the one or more connections that are dropped include the first call connection leg, second call connection leg, and third call connection leg.

In some aspects, the techniques described herein relate to a method, wherein the one or more servers includes the proxy server.

In some aspects, the techniques described herein relate to a method, wherein the call destination server is a call center server.

In some aspects, the techniques described herein relate to a method, wherein the transfer request is automatically sent by the call center server upon receiving the inbound call at the first call destination.

In some aspects, the techniques described herein relate to a method, wherein the transfer request is automatically sent by the call center server upon receiving an input through an interactive voice response system associated with the call center server.

In some aspects, the techniques described herein relate to a method, wherein the transfer request is automatically sent by the call center server upon receiving an input from an agent terminal.

In some aspects, the techniques described herein relate to a method, wherein rerouting the inbound call to the second call destination further includes creating a new outbound call leg to a session initiation protocol endpoint.

In some aspects, the techniques described herein relate to a method, wherein rerouting the inbound call to the second call destination further includes creating a new outbound call leg to another voice carrier based on least cost routing.

In some aspects, the techniques described herein relate to a method for rerouting communication in a unified communications network, the method including: receiving an inbound call at a first session border controller; routing the inbound call to a first call destination based on a called number associated with the inbound call; receiving, at a transfer server, a first transfer request from a server associated with the first call destination; determining, at the transfer server, a new destination number for transferring the inbound call; transmitting, from the transfer server, a second transfer request to at least one server maintaining the inbound call; and rerouting, at the first session border controller, the inbound call to a second call destination based on the new destination number in the second transfer request.

In some aspects, the techniques described herein relate to a method, wherein the first call destination includes a call center server.

In some aspects, the techniques described herein relate to a method, further including determining, at a redirect server, a redirect number mapped to the inbound call number, wherein routing the inbound call is in accordance with the determined redirect number.

In some aspects, the techniques described herein relate to a method, wherein the first transfer request is received while the inbound call is ongoing and the first transfer request is an out-of-band call signaling message.

In some aspects, the techniques described herein relate to a method, wherein routing the inbound call to the first call destination based on the called number further includes creating a plurality of call legs.

In some aspects, the techniques described herein relate to a method, wherein the second transfer request is an out-of-band call signaling message.

In some aspects, the techniques described herein relate to a method, further including dropping at least one connection associated with the inbound call to the first call destination based on the second transfer request.

In some aspects, the techniques described herein relate to a method, wherein rerouting the inbound call to the second call destination further includes creating a new outbound call leg to a SIP endpoint.

In some aspects, the techniques described herein relate to a method, wherein rerouting the inbound call to the second call destination further includes creating a new outbound call leg to another voice carrier based on least cost routing.

In some aspects, the techniques described herein relate to a system for rerouting communication in a unified communications network including: a first session border controller, wherein the first session border controller: receives an inbound call; routes the inbound call to a first call destination based on a called number associated with the inbound call; a transfer server, wherein the transfer server: receives a first transfer request from a server associated with the first call destination; determines a new destination number for transferring the inbound call; transmits a second transfer request to at least one server maintaining the inbound call; and causes the inbound call to be rerouted to a second call destination based on the new destination number.

DETAILED DESCRIPTION

Figure 1A:
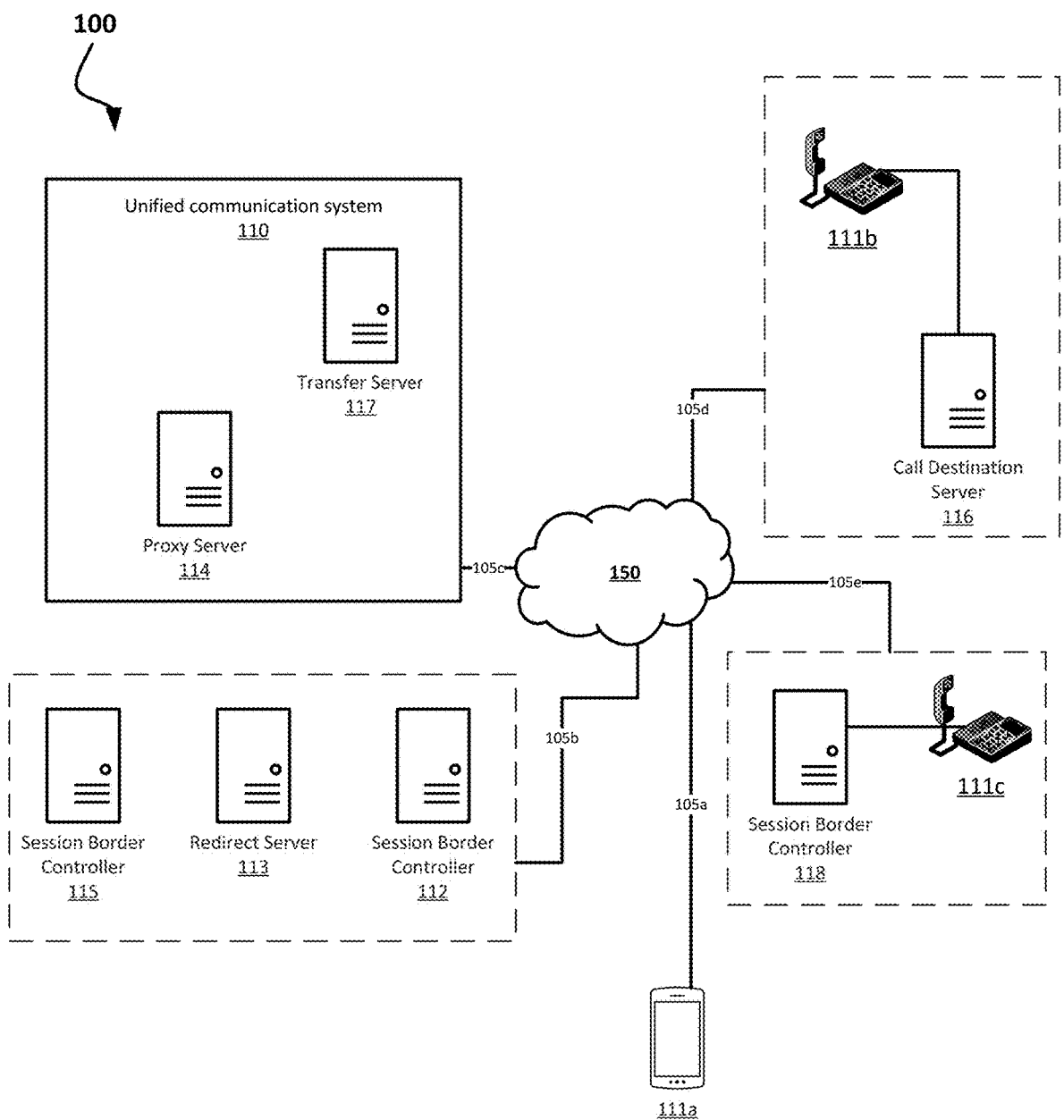
FIG. 1A is a diagram illustrating a unified communications network, according to some implementations of the present disclosure.

It is to be understood that the disclosure is not limited in its application to the details of construction and the arrangement of components set forth in the following description or illustrated in the following drawings. The features described in the disclosure are capable of other implementations and of being practiced or of being carried out in various ways. Also, it is to be understood that the phraseology and terminology used herein is for the purpose of description and should not be regarded as limiting.

As used throughout, the singular forms "a," "an" and "the" include plural referents unless the context clearly dictates otherwise. Thus, for example, reference to "a server" can include two or more such servers unless the context indicates otherwise.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The following discussion is presented to enable a person skilled in the art to make and use implementations of the disclosure. Various modifications to the illustrated implementations will be readily apparent to those skilled in the art, and the generic principles herein can be applied to other implementations and applications without departing from implementations of the disclosure. Thus, implementations of the disclosure are not intended to be limited to implementations shown but are to be accorded the widest scope consistent with the principles and features disclosed herein. The following detailed description is to be read with reference to the figures, in which like elements in different figures have like reference numerals. The figures, which are not necessarily to scale, depict selected implementations and are not intended to limit the scope of implementations of the disclosure. Skilled artisans will recognize the examples provided herein have many useful alternatives and fall within the scope of implementations of the disclosure.

FIG. 1A is a block diagram that describes some network elements in a connected communications network, according to some implementations of the present disclosure. The methods described in FIG. 3A, FIG. 3B, and FIG. 4 further describe some operations that can be implemented with the network elements illustrated in FIG. 1A. In some implementations, as illustrated in FIG. 1A, a system 100 may include a unified communications system 110. In some implementations, the unified communications system 110 may include a transfer server 117 and a proxy server 114. In some implementations, unified communications system 110 may include one or more proxy servers. In some implementations, a unified communications system 110 may include one or more other devices or systems to enable unified communications between users of the unified communications system. For example, unified communications system 110 may include one or more other servers and/or other devices to provide users the ability to make and receive voice calls, provide text and chat services, audio/video conferencing, and desktop sharing between users and other suitable communications devices or services. In some implementations, unified communications system 110 may include servers and other devices to quickly provision a unified communications network for an organization. In some implementations, unified communications system 110 may be in communication with at least one network, such as network 150. Unified communications system 110 may be communication with network 150 via one or more network links such as network link 105c. Network link 105c can be a wired or wireless connection. In some implementations, one or more servers in unified communications system 110 can be directly or indirectly connected to network 150 using suitable communication technologies. In some implementations, one or more communication devices may be in the communication path between unified communications system 110 and the network 150. In some implementations, network 150 is a suitable public or private network. In some implementations, network 150 is a network such as the Internet. It should be appreciated that in some implementations unified communications system 110 may be in communication with a plurality of different networks and a plurality of different end points, wherein unified communications system 110 may communicate with one or more of the different end points.

It should be appreciated that communication link 105a, communication link 105b, communication link 105c, communication link 105d, and communication link 105e can be a wired or wireless connection or some combination thereof. In some implementations, these communication links between network 150 and the systems shown in FIG. 1A can be direct and/or indirect connections using suitable communication technologies. In some implementations, one or more communication devices may be in the communication path along these communication links between the systems shown in FIG. 1A and network 150.

In some implementations, the unified communications system 110 may be in direct or indirect communication with a plurality of different devices and systems. As shown in FIG. 1A, unified communications system 110 can be in communication with a communication terminal 111a, a session border controller 112, a redirect server 113, a session border controller 115, a call destination server 116, a communications terminal 111b, a session border controller 118, and a communications terminal 111c. It should be appreciated that the different systems and devices illustrated in FIG. 1A are merely for example, wherein the unified communications system 110 may connect to one or more different devices, such as are available via a network, such as the Internet.

As illustrated in FIG. 1A, a communication terminal 111a may be in communication with network 150 via a network link 105a. In some implementations, the communication terminal 111a is a phone, such as a mobile phone, smart phone, a desktop phone, a VoIP phone, a computer, or another suitable device capable of making voice calls and/or interacting with a network. In some implementations, communication terminal 111a can make a call to a first number while attempting to reach a destination, such as call destination server 116 or to communications terminal 111b. In some implementations, call destination server 116 can be a call center server that a company uses to manage customer inquiries. In some implementations, the call can be sent via communication link 105a through network 150 to a system that can connect the call to the intended destination.

In some implementations, the call made by the communication terminal 111a is sent to a session border controller (SBC), such as session border controller 112. In some implementations, an SBC is a network server deployed in voice over IP (VoIP) infrastructures that provides interworking between end devices or application servers. An SBC can carry signaling messages and media flows between such end devices and/or application servers. SBCs can be employed in enterprise infrastructures or any carrier network delivering commercial residential, business, fixed-line, or mobile VoIP services. In some implementations, session border controller 112 attempts to terminate the call from communication terminal 111a to the intended destination (e.g., call destination server 116 or communications terminal 111b). It should be appreciated that the terminology terminate, as used herein, means to complete/provisional a call to an intended call destination rather than ending a call. In some implementations, the session border controller 112 may look up where to route the call from communication terminal 111a in a database. In some implementations, session border controller 112 may send an inquiry to a server such as redirect server 113 to inquire where to route the call from communication terminal 111a. In some implementations, redirect server 113 lookups in a database a mapping between the called number (e.g., the phone number that communication terminal 111a used to dial when attempting to reach call destination server 116) and a phone number or destination address (e.g., a session initiation protocol address or SIP address) that can be used to reach the intended destination. If redirect server 113 finds a mapping between the called number another phone number or destination address, the redirect server 113 may pass a redirect phone number or destination address back to the session border controller 112 for further call routing to the intended destination. It should be appreciated that redirect server 113 may be a least cost route server or other suitable server that handles network policy and call route management.

In some implementations, the phone number or destination address is obfuscated from the user for one or more reasons. For example, the entity operating call destination server 116 may want calls to be routed through a network associated with session border controller 112 before reaching the call destination server 116. This may be to route incoming call traffic to call destination server 116 through a lower cost network or to get access to a more feature rich network system provided by the entity operating the session border controller 112.

In some implementations, session border controller 112 may open a call leg to a proxy server, such as proxy server 114 based on the redirect phone number or destination address. In some implementations, session border controller 112 may communicate with proxy server 114 through network 150 and links 105b and 105c. In some implementations, session border controller 112 can communicate with proxy server 114 in other suitable ways. In some implementations, session border controller 112 may be in direct or indirect communication with proxy server 114. In some implementations, proxy server 114 is a server that is configured to process data into data that can be used to communicate with other systems. For example, proxy server 114 may process information from call destination server 116 or information associated with call destination server 116, and convert such information into a SIP refer that an SBC can process to connect a call. In some implementations, proxy server 114 is not required and session border controller 112 can attempt to route the call to the intended destination.

In some implementations, proxy server 114 may open a call leg with session border controller 115. That is, in some implementations, proxy server 114 may route the call from communication terminal 111a to session border controller 115 for further processing. In some implementations, proxy server 114 may pass the redirect phone number or destination address to session border controller 115. In some implementations, depending on how call destination server 116 is in communication with session border controller 115, session border controller 115 may open one or more additional call legs with call destination server 116 to route the call to call destination server 116. In some implementations, such as where call destination server 116 is a call center server, call destination server 116 may route the call to a call center agent, such as an agent that can answer communications terminal 111b and talk with a user at communication terminal 111a. In some implementations, session border controller 115 is not required. In some implementations, session border controller 112 or some other suitable device can attempt to route the call to the intended destination without session border controller 115 (and/or without proxy server 114).

In some implementations, the call between communication terminal 111a and call destination server 116 and/or communications terminal 111b may need to be transferred to a new call destination. In one such example, in a call center scenario, the agent at communications terminal 111b is unable to help the user at communication terminal 111a and needs to transfer the call to a different agent associated with a different network. For example, the call from the user at communication terminal 111a should be forwarded to an agent associated with communications terminal 111c on a different network through session border controller 118. In some implementations, calls routed through call destination server 116 are more expensive than another destination (e.g., call minutes cost more than other destinations), and a company using the call center system associated with call destination server 116 wishes to receive the call from communication terminal 111a through a lower cost network (e.g., a network associated with session border controller 118 and communications terminal 111c). However, due to the complexity of call routing, in some implementations, some systems may not have the capability to transfer or reroute calls. For example, in some implementations, call center software associated with call destination server 116 may not have the capability to transfer the call from communication terminal 111a to the new destination communications terminal 111c. In some implementations, to address this deficiency, a transfer server 117 can enable rerouting a call from a call origination point to a new call destination. In some implementations, transfer server 117 can receive out-of-band signaling messages related to a call, such as the call between communication terminal 111a and communications terminal 111b. In some implementations, transfer server 117 can inject further out-of-band signaling into devices or systems, such as proxy server 114, and cause proxy server 114 or other devices in the call path between communication terminal 111a and communications terminal 111b to reroute the call to a new destination, such as communications terminal 111c.

In one example implementation, call destination server 116 or communications terminal 111b can send a request to transfer server 117 to transfer the call from communication terminal 111a to a different destination (e.g., communications terminal 111c). For example, an agent at communications terminal 111b may initiate a call transfer request at call destination server 116. In some implementations, call destination server 116 may send the call transfer request to transfer server 117 in accordance with the instructions from communications terminal 111b. It should be appreciated that in some implementations, the transfer request can be sent directly from 111b to transfer server 117. In some implementations, as soon as call destination server 116 receives the call from session border controller 115, call destination server 116 can be configured to send a message to 117 to request the transfer. In some implementations, the user at communication terminal 111a can be presented with an interactive voice response (IVR) menu that provides the user with one or more selection options. In some implementations, the user at communication terminal 111a may select an option to have the call routed to an agent at communications terminal 111b. In some implementations, the user may select an option that requires the call to be routed to an agent at communications terminal 111c. In a scenario where the user selected to be connected with an agent at communications terminal 111c, the IVR system may send a message to 117 to request the transfer.

In some implementations, the transfer server 117 receives a first transfer request from a server associated with the first call destination 116. In some implementations, the first transfer request includes new call destination information. For example, call destination server 116 may transmit to transfer server 117 a phone number or SIP address for a new call destination. It should be appreciated that first transfer request can include any suitable information. In some implementations, 117 may perform a database lookup to determine how to route the call from 111a to the new call destination. In some implementations, transfer server 117 may send a second transfer request to proxy server 114. In some implementations, the second transfer request is a SIP refer message or other suitable signaling message. As noted above, in some implementations, transfer server 117 can send the second transfer request to one or more other devices that are maintaining the call between communication terminal 111a and communications terminal 111b (e.g., the ongoing call). In some implementations, proxy server 114 may send a message to session border controller 112 to create a new call leg to a new end point, such as session border controller 118. In some implementations, when session border controller 118 receives the signaling from session border controller 112 to setup the new call leg, session border controller 118 may route the call to the new intended destination, such as communications terminal 111*c* to terminate the call at the new destination. In some implementations, once the new call leg is setup between session border controller 112 and session border controller 118, session border controller 112 bridges the call from communication terminal 111*a* to session border controller 118 and session border controller 118 terminates the call to communications terminal 111*c*. It should be appreciated that session border controller 112 may route the call to one or more other devices, depending on the intended destination. In some implementations, to release network resources, proxy server 114 may also send signaling messages to one or more network devices used to connect the call between communication terminal 111*a* and communications terminal 111*b* to end/drop the connections. For example, proxy server 114 can send out a signaling message to session border controller 115 to end/drop the call and session border controller 115 may send signaling messages to 116 to end/drop the call. In some implementations, one or more devices in the call path between communication terminal 111*a* and communications terminal 111*b* may release the resources used to maintain the ongoing call.

Figure 1B:
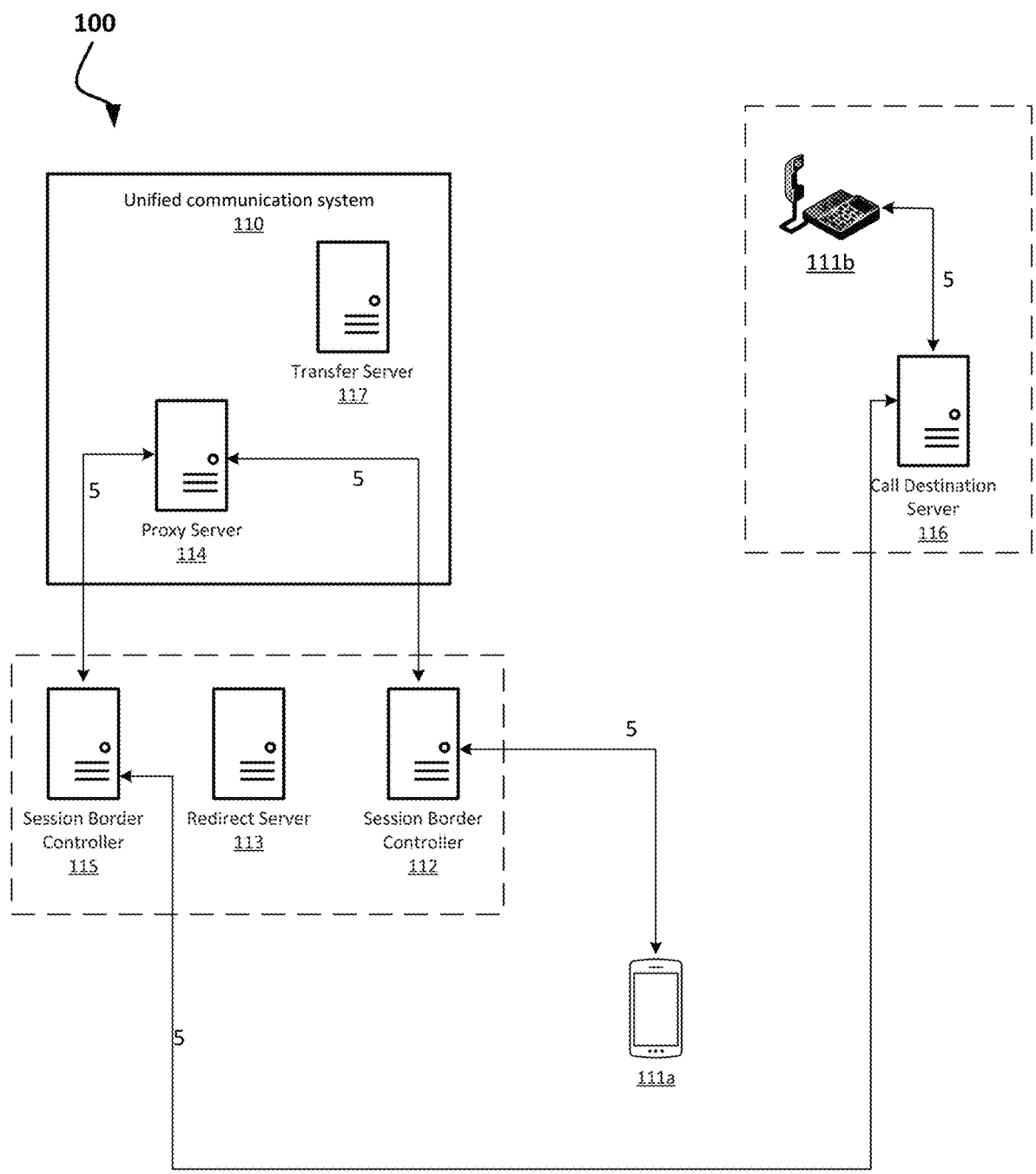
FIG. 1B is a diagram illustrating a unified communications network and a call path between a first communication terminal and a second communication terminal, according to some implementations of the present disclosure.

FIG. 1B is a diagram illustrating a unified communications network and a call path between a first communication terminal and a second communication terminal, according to some implementations of the present disclosure. FIG. 1B shows the connected call path 5 between communication terminal 111*a* and communications terminal 111*b*.

Figure 1C:
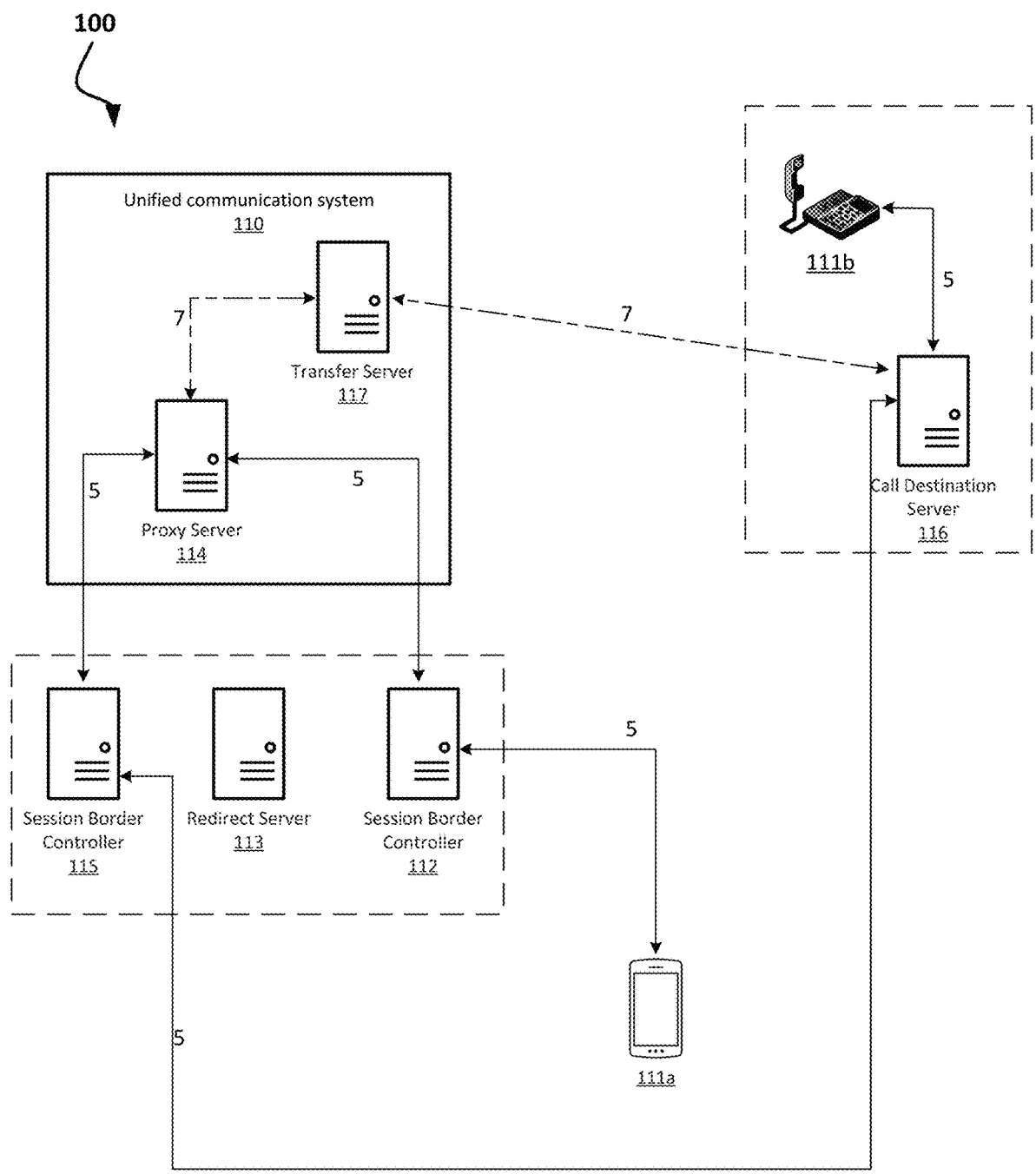
FIG. 1C is a diagram illustrating a unified communications network and a call path between a first communication terminal and a second communication terminal, according to some implementations of the present disclosure.

FIG. 1C is a diagram illustrating a unified communications network and a call path between a first communication terminal and a second communication terminal, according to some implementations of the present disclosure. FIG. 1C also shows the out-of-band signaling path 7 to transfer server 117 to request a call transfer and end the communications between communication terminal 111*a* and communications terminal 111*b*.

Figure 1D:
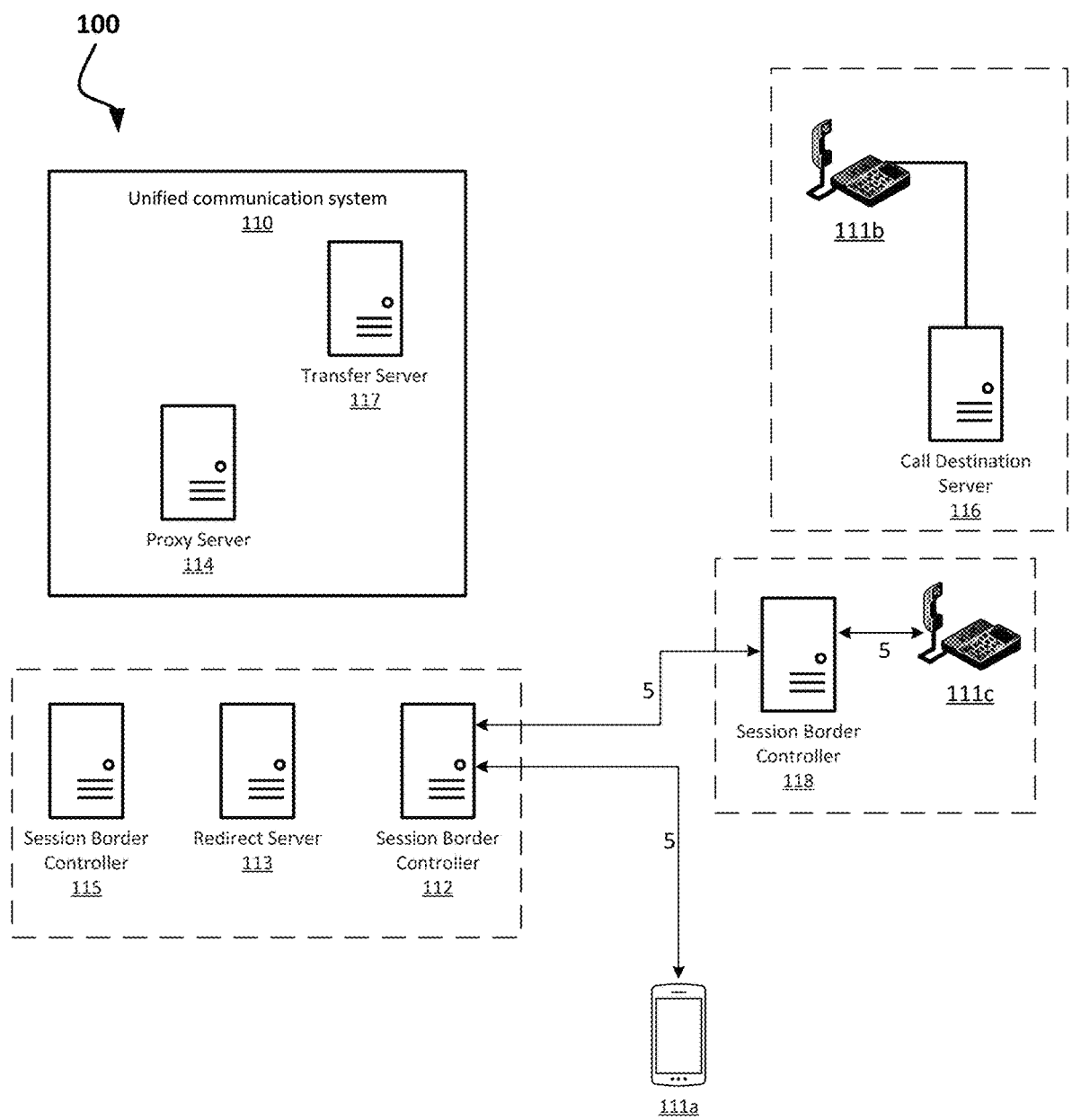
FIG. 1D is a diagram illustrating a unified communications network and a rerouted call path between a first communication terminal and a third communication terminal, according to some implementations of the present disclosure.

FIG. 1D is a diagram illustrating a unified communications network and a rerouted call path between a first communication terminal and a third communication terminal, according to some implementations of the present disclosure. FIG. 1D shows the connected call path 5 has been rerouted between communication terminal 111*a* and communications terminal 111*c*. FIG. 1D also shows that some of the call resources used to connect communication terminal 111*a* and communications terminal 111*b* are freed from supporting the call, since the call was transferred to the new destination communications terminal 111*c* (e.g., the call legs between session border controller 112, proxy server 114, session border controller 115, and call destination server 116 have been broken down and no longer exist).

It should be appreciated that signaling from the original call destination to transfer server 117 and from transfer server 117 to proxy server 114 (or some other suitable device) is out-of-band signaling from the call path between communication terminal 111*a* and communications terminal 111*b*, whereas call transfer request for more capable telecommunications equipment typically come through in-band signaling. Such call transfers or call rerouting using out-of-band signaling enables communications systems (such as call destination server 116) that do not have certain features (e.g., call transfer) to provide a more robust communication system to end users and enables less capable devices such as call destination server 116 to offer features that may be available on more complex and more expensive communications equipment (which may use in-band signaling). It should also be appreciated that such out-of-band signaling can be used to provide other network features that may not have been otherwise available on less expensive system. In some implementations, such out-of-band signaling provides a technical improvement because it enables cheaper and less complex devices to be deployed in a communication network (e.g., call destination server 116) and enables centralization of complex functions such as call transfers. In some implementations, such out-of-band signaling also provides a technical improvement because it enables calls to be transferred to new destinations that use less resources (e.g., the call path from communication terminal 111*a* to communications terminal 111*b* uses more devices to complete the call than the call path from communication terminal 111*a* to communications terminal 111*c*) and may provide cheaper call minutes between endpoints.

Figure 2:
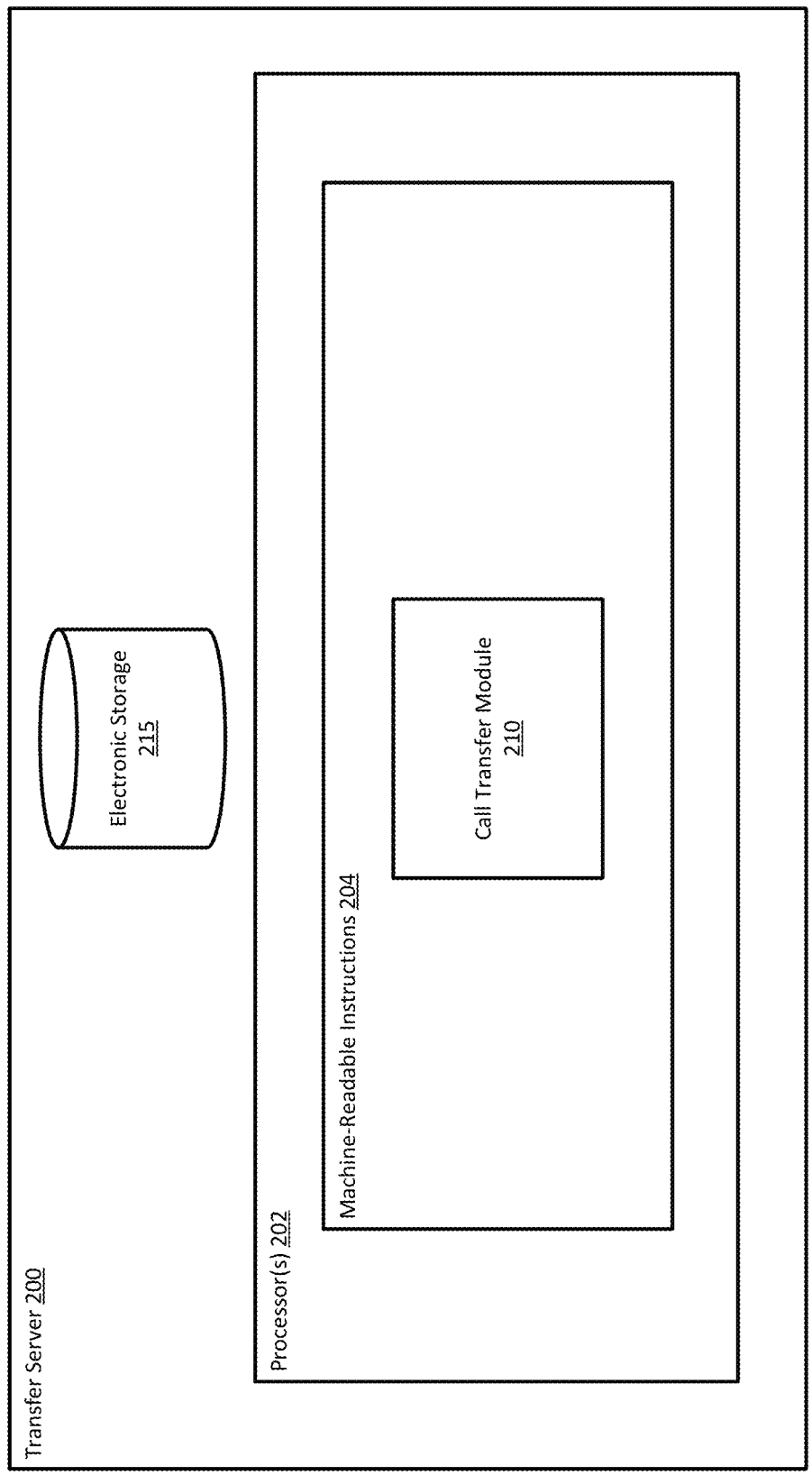
FIG. 2 is a block diagram illustrating a call transfer server, according to some implementations of the present disclosure.

FIG. 2 is a block diagram illustrating a transfer server, according to some implementations of the present disclosure. In some implementations, transfer server 200 in FIG. 2 is one possible representation of transfer server 117 previously discussed. In some implementations, transfer server 200 may include one or more computing platforms. Transfer server 200 may be configured to communicate with one or more devices (e.g., SBCs, proxy servers, computers, telecommunications equipment, etc.) according to a client/server architecture, a peer-to-peer architecture, and/or other suitable architectures. In some implementations, the transfer server 200 may include one or more processors 202, one or more electronic storage devices 215 (e.g., non-transitory memory devices), and machine-readable instructions 204. In some implementations, the transfer server 200 may include a call transfer module 210.

Transfer server 200 may be configured by machine-readable instructions 204. Machine-readable instructions 204 may include one or more instruction modules. The instruction modules may include computer program modules. The instruction modules may include one or more of a call transfer module 210 and other instruction modules.

In some implementations, call transfer module 210 is configured to execute and run in the background on the transfer server 200 to receive call transfer requests from devices in one or more networks such as call destination server 116, communications terminal 111*b*, or other suitable network devices. In some implementations, the transfer server 200 communicates with devices in a unified communication system 110 using the call transfer module 210 via secure and encrypted communications. Other suitable communication methods with or without security can be used in various implementations. In some implementations, the call transfer module 210 uses one or more databases, such as Microsoft™ SQL Server databases, for holding ancillary and core data for operating the call transfer module 210 and related components of the transfer server 200. In some implementations, a transfer server 200 may include one or more running instances of a call transfer module 210.

While certain features and functions of the call transfer module 210 were described, it should be appreciated that the described features and functions of this module are not intended to be limiting. Furthermore, additional features and functions of the transfer server 200 and its modules will be described in further detail in this disclosure.

In some implementations, transfer server 200 may be operatively linked to other devices via one or more electronic communication links. For example, such electronic communication links may be established, at least in part, via a network such as the Internet and/or other networks. It will be appreciated that this is not intended to be limiting, and that the scope of this disclosure includes implementations in which transfer server 200 may be operatively linked to other devices via some other communication media. In some implementations, transfer server 200 may be operatively linked to other transfer servers via suitable communication media. By way of non-limiting example, given transfer server 200 may include one or more of a server, a desktop computer, a laptop computer, a handheld computer, a tablet computing platform, and/or other suitable computing platforms specially configured to perform call transfers based on out-of-band signaling.

Transfer server 200 may include electronic storage 215, one or more processors 202, and/or other components. Transfer server 200 may include communication lines, or ports to enable the exchange of information with a network and/or other computing platforms. Illustration of transfer server 200 in FIG. 2 is not intended to be limiting. Transfer server 200 may include a plurality of hardware, software, and/or firmware components operating together to provide the functionality attributed herein to transfer server 200. For example, transfer server 200 may be implemented by a cloud of computing platforms operating together as transfer server 200.

Electronic storage 215 may comprise non-transitory storage media that electronically stores information. The electronic storage media of electronic storage 215 may include one or both of system storage that is provided integrally (i.e., substantially non-removable) with transfer server 200 and/or removable storage that is removably connectable to transfer server 200 via, for example, a port (e.g., a USB port, a firewire port, etc.) or a drive (e.g., a disk drive, etc.). Electronic storage 215 may include one or more of optically readable storage media (e.g., optical disks, etc.), magnetically readable storage media (e.g., magnetic tape, magnetic hard drive, etc.), electrical charge-based storage media (e.g., EEPROM, RAM, etc.), solid-state storage media (e.g., flash drive, etc.), and/or other electronically readable storage media. Electronic storage 215 may include one or more virtual storage resources (e.g., cloud storage, a virtual private network, and/or other virtual storage resources). Electronic storage 215 may store software algorithms, information determined by processor(s) 202, information received from transfer server 200, information received from other devices (e.g., communications terminal 111b, call destination server 116, servers, telecommunications equipment, etc.), and/or other information that enables transfer server 200 to function as described herein.

Processor(s) 202 may be configured to provide information processing capabilities in transfer server 200. As such, processor(s) 202 may include one or more of a digital processor, an analog processor, a digital circuit designed to process information, an analog circuit designed to process information, a state machine, and/or other mechanisms for electronically processing information. Although processor(s) 202 is shown in FIG. 2 as a single entity, this is for illustrative purposes only. In some implementations, processor(s) 202 may include a plurality of processing units. These processing units may be physically located within the same device, or processor(s) 202 may represent processing functionality of a plurality of devices operating in coordination. Processor(s) 202 may be configured to execute call transfer module 210 and/or other modules. Processor(s) 202 may be configured to execute call transfer module 210 and/or other modules by software; hardware; firmware; some combination of software, hardware, and/or firmware; and/or other mechanisms for configuring processing capabilities on processor(s) 202. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although call transfer module 210 is illustrated in FIG. 2 as being implemented within a single processing unit, in implementations in which processor(s) 202 includes multiple processing units, one or more of call transfer module 210 may be implemented remotely from the other modules. The description of the functionality provided by the call transfer module 210 described herein is for illustrative purposes, and is not intended to be limiting, as call transfer module 210 may provide more or less functionality than is described. For example, call transfer module 210 may be eliminated, and some or all of its functionality may be provided by other modules or other devices, such as, but not limited to proxy server 114 or other suitable servers. As another example, processor(s) 202 may be configured to execute one or more additional modules that may perform some or all of the functionality attributed below to one of call transfer module 210.

Figure 3A:
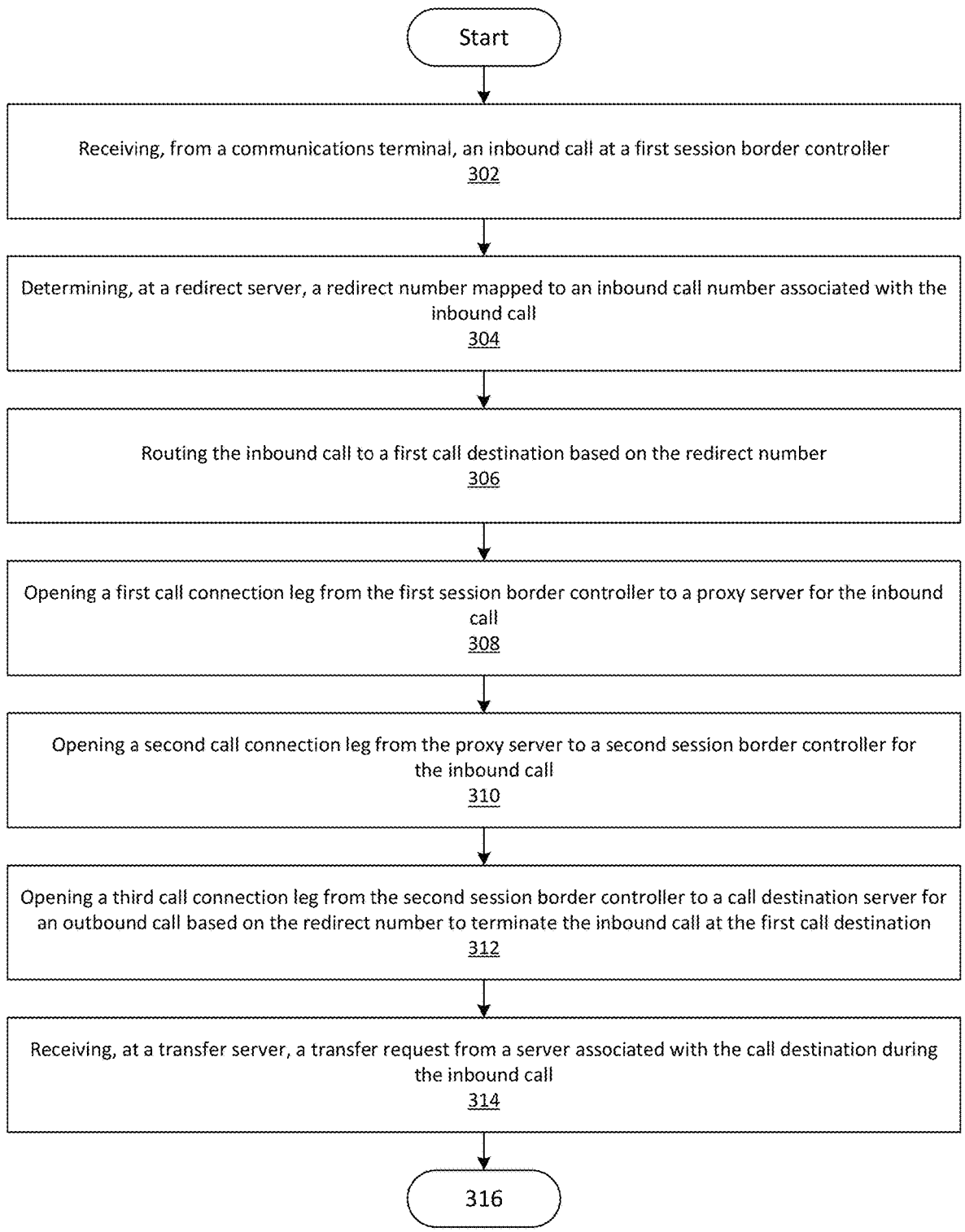
FIG. 3A is a flowchart illustrating a method for rerouting communication in a unified communications network, according to some implementations of the present disclosure.
Figure 3B:
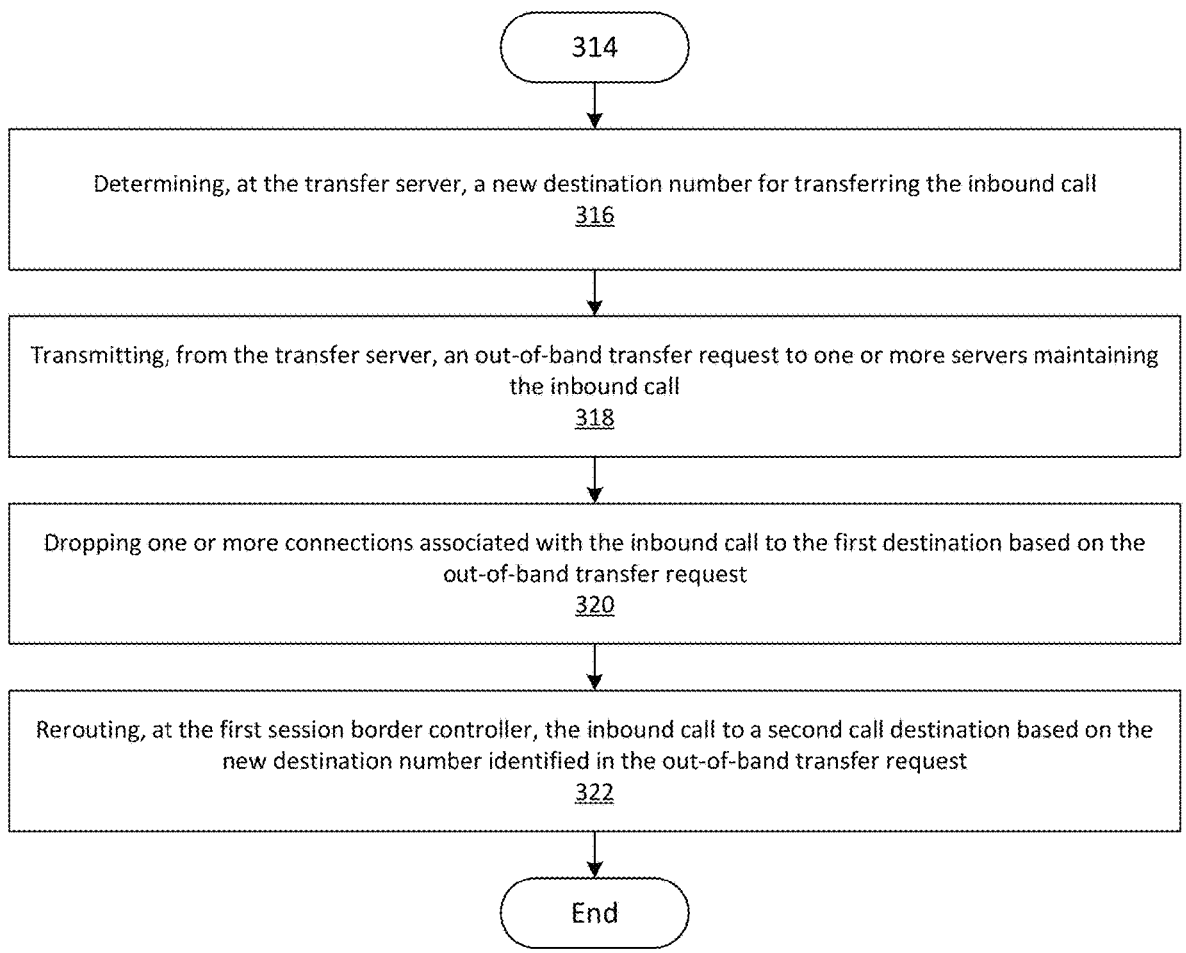
FIG. 3B is a flowchart extending from FIG. 3A and further illustrating the method for rerouting communication in a unified communications network, according to some implementations of the present disclosure.

FIGS. 3A to 3B are flowcharts that describe a method for rerouting communication in a unified communications network, according to some implementations. In some implementations, FIG. 3A and FIG. 3B are a further illustration of the call transfer process using out-of-band signaling described in FIG. 1A to FIG. 1D. In some implementations, at 302, the method may include receiving an inbound call at a first session border controller such as session border controller 112. For example, communication terminal 111a from FIG. 1A may initiate a call to a call center call destination server 116. In some implementations, because the session border controller 112 was set up to handle calls for the call destination server 116, the call from communication terminal 111a is initially routed to session border controller 112.

At 304, the method may include determining, at a redirect server, a redirect number mapped to the inbound call number. In some implementations, for example, session border controller 112 may seek to determine where to route the call from communication terminal 111a. In some implementations, session border controller 112 may send a request to a policy and routing server (e.g., a PSX) or may send the request to a redirect server, such as redirect server 113 to determine where to route the call from communication terminal 111a. In some implementations, as discussed in FIG. 1A, redirect server 113 may have a database that stores a mapping between the phone number called (e.g., the number that communication terminal 111a dialed) and the actual destination, such as call destination server 116. In some implementations, redirect server 113 can return to session border controller 112 a redirect number to enable session border controller 112 to route the call to call destination server 116.

At 306, the method may include routing the inbound call to a first call destination based on the redirect number. In some implementations, for example, session border controller 112 uses the redirect number to route the call from communication terminal 111a to the call destination server 116. At 308, the method may include opening a first call connection leg from the first session border controller to a proxy server for the inbound call. In some implementations, for example, to route the call to call destination server 116, session border controller 112 may open a call leg to proxy server 114. It should be appreciated that in some implementations, session border controller 112 can route the call to other devices associated with other networks, depending on what information was returned from a PSX or a redirect server. In some implementations, at 310, the method may include opening a second call connection leg from the proxy server to a second session border controller for the inbound call. In some implementations, the session border controller can be a second session border controller. In some implementations, the session border controller can be the same session border controller as the first session border control. For example, in some implementations, proxy server 114 may open a call leg to session border controller 115. In some implementations, proxy server 114 may open a call leg to session border controller 112. It should be appreciated that proxy server 114 can open a call leg to any suitable next device to terminate the call. In some alternative implementations, at 310, the method may include opening a second call connection leg from the proxy server to the first session border controller for the inbound call (or some other suitable session border controller). At 312, the method may include opening a third call connection leg from the second session border controller to a call destination server for an outbound call based on the redirect number to terminate the inbound call at the first call destination. In some implementations, for example, session border controller 115 may determine that it can open a call leg with call destination server 116. In some implementations, session border controller 115 can be in direct or indirect communication with call destination server 116, thus, session border controller 115 may cause one or more call legs to be opened to connect the call from communication terminal 111a with call destination server 116. It should be appreciated that session border controller 115 can open a call leg to any suitable next device to terminate the call. In some implementations, as discussed in FIG. 1A, when the call from communication terminal 111a to call destination server 116 is connected, call destination server 116 may route the call to communications terminal 111b. While the examples are described in the context of a call center, it should be appreciated that the call from communication terminal 111a does not need to be to a call center, and communication terminal 111a can connect with any suitable destination end point and the transfer functions discussed herein can be similarly applied. Furthermore, the call from communication terminal 111a can be routed through any suitable number of devices and networks to reach the intended destination of the call.

As shown at 314, the method may include receiving, at a transfer server, a transfer request from a server associated with the call destination during the inbound call. At some point, before or during the call between communication terminal 111a and call destination server 116, the call may need to be transferred. However, as noted above, in some implementations, call destination server 116 may not have the features or functionality to transfer a call. In some implementations, call destination server 116 may have been configured to deliberately avoid having the features or functionality to transfer a call. To provide such call transfer features, a transfer server, such as transfer server 117 can host the features or functionality to transfer a call, and out-of-band signaling can be used to reroute a call from one destination to another. In some implementations, the features or functionality to transfer a call in transfer server 117 can be made accessible through application programming interface (API) calls or other suitable communication mechanisms. In some implementations, to start a call transfer process through transfer server 117, call destination server 116 or communications terminal 111b can be configured to send a transfer request to transfer server 117. In some implementations, the transfer request may include a new call destination number or a SIP address. It should be appreciated that the transfer request can include any suitable information.

In some implementations, at 316, the method may include determining, at the transfer server, a new destination number for transferring the inbound call. In some implementations, transfer server 117 may need to lookup how to reroute the call from the current destination address at call destination server 116 (or communications terminal 111b) to a new destination, such as communications terminal 111c. In some implementations, for example, transfer server 117, may need to determine that the call from communication terminal 111a is routed through session border controller 112, proxy server 114, and session border controller 115 so that transfer server 117 knows which devices it should communicate with to reroute the call from communication terminal 111a. In some implementations, transfer server 117 does not need to determine how the call from communication terminal 111a is being routed, and sends a transfer request to one or more devices that may manage one leg of the call from communication terminal 111a to call destination server 116. At 318, the method may include transmitting, from the transfer server, an out-of-band transfer request to one or more servers maintaining the inbound call. For example, transfer server 117 may send to proxy server 114 and/or some or all proxy servers in unified communications system 110 an out-of-band transfer request to reroute the call from communication terminal 111a to communications terminal 111c.

At 320, the method may include dropping one or more connections associated with the inbound call to the first destination based on the out-of-band transfer request. For example, proxy server 114 can send a message to session border controller 112, session border controller 115 to breakdown or end one or more call legs for the call from communication terminal 111a to call destination server 116. In some implementations, session border controller 115 sends a message to call destination server 116 to end the call leg between them. At 322, the method may include rerouting, at the first session border controller, the inbound call to a second call destination based on the new destination number identified in the out-of-band transfer request. For example, the message from proxy server 114 to session border controller 112 may also include information regarding where to reroute the call from communication terminal 111a to a new destination. In some implementations, for example, session border controller 112 may receive the new phone number or SIP address, which would result in the call from communication terminal 111a to be redirected to communications terminal 111c. For example, session border controller 112 may open a new call leg to session border controller 118. In some implementations, session border controller 118 may determine how to route the call from communication terminal 111a to communications terminal 111c and may cause one or more additional call legs to be opened to terminate the call with communications terminal 111c.

The method discussed in FIG. 3A and FIG. 3B may include performing one or more additional processes. In some implementations, the transfer request may be an out of band signaling message from the inbound call (e.g., the call from communication terminal 111a to session border controller 112). In some implementations, the one or more connections that may be dropped comprise the first call connection leg, second call connection leg, and third call connection leg. In some implementations, the one or more servers may comprise the proxy server. In some implementations, the call destination server may be a call center server.

In some implementations, the transfer request may be automatically sent by the call center server upon receiving the inbound call at the first call destination. In some implementations, the transfer request may be automatically sent by the call center server upon receiving an input through an interactive voice response system associated with the call center server. The input can be a selection input by the user for a particular destination (e.g., sales versus technical support). In some implementations, the transfer request may be automatically sent by the call center server upon receiving an input from an agent terminal. In some implementations, rerouting the inbound call to the second destination further comprises creating a new outbound call leg to a session initiation protocol endpoint (e.g., the call leg between session border controller 112 and session border controller 118). In some implementations, rerouting the inbound call to the second destination further comprises creating a new outbound call leg to another voice carrier based on least cost routing (e.g., the call leg between session border controller 112 and session border controller 118).

Figure 4:
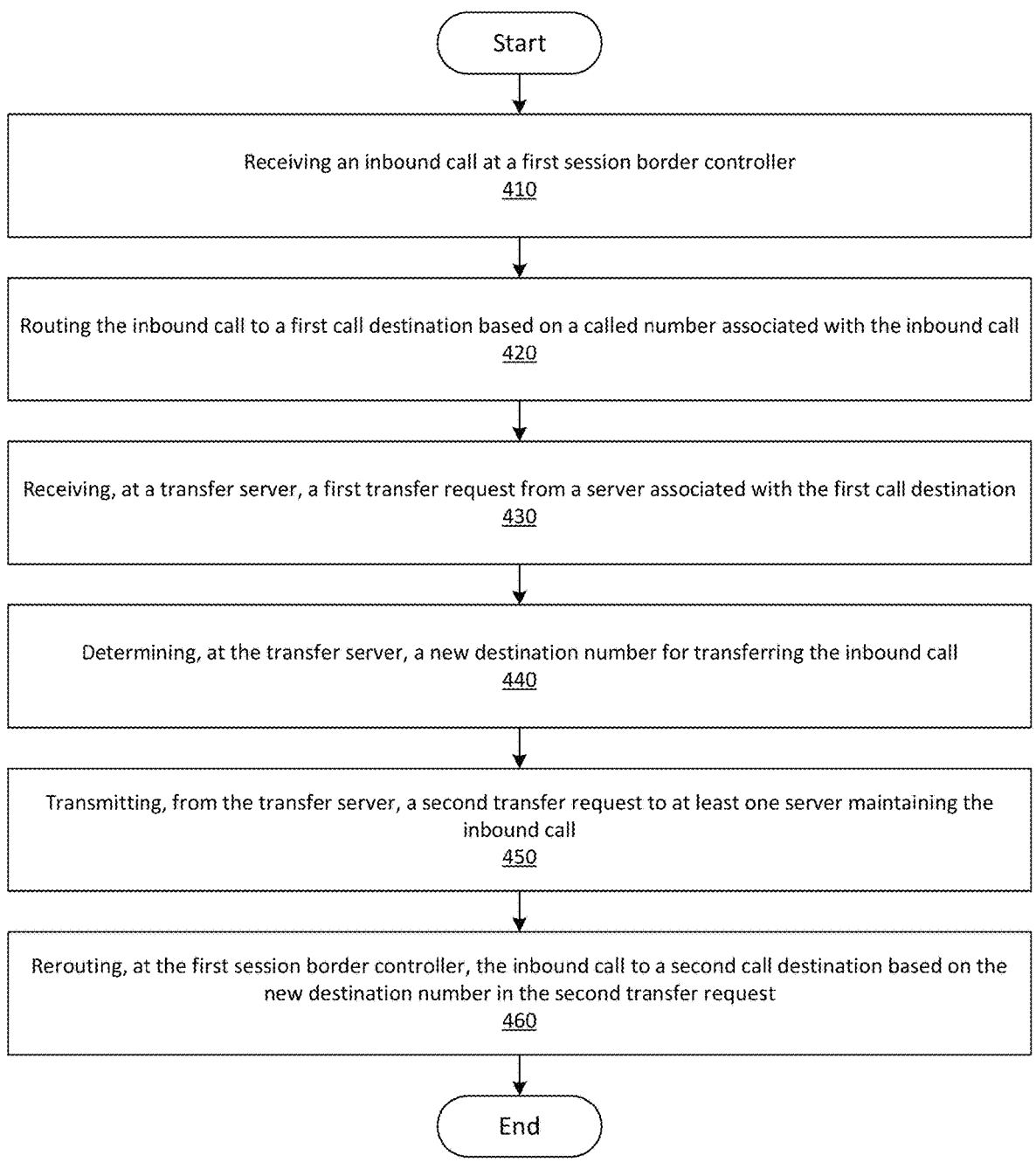
FIG. 4 is a flowchart illustrating a method for rerouting communication in a unified communications network, according to some implementations of the present disclosure.

FIG. 4 is a flowchart that describes a method for rerouting communication in a unified communications network, according to some implementations of the present disclosure. In some implementations, FIG. 4 is an alternative illustration of the call transfer process using out-of-band signaling described in FIG. 1A to FIG. 1D. In some implementations, at 410, the method may include receiving an inbound call at a first session border controller. At 420, the method may include routing the inbound call to a first call destination based on a called number associated with the inbound call. At 430, the method may include receiving, at a transfer server, a first transfer request from a server associated with the first call destination.

In some implementations, at 440, the method may include determining, at the transfer server, a new destination number for transferring the inbound call. At 450, the method may include transmitting, from the transfer server, a second transfer request to at least one server maintaining the inbound call. At 460, the method may include rerouting, at the first session border controller, the inbound call to a second call destination based on the new destination number in the second transfer request.

The method discussed in FIG. 4 may include performing one or more additional processes. In some implementations, the first call destination may comprise a call center server. In some implementations, the method may include determining, at a redirect server, a redirect number mapped to the inbound call number. Routing the inbound call may be in accordance with the determined redirect number. In some implementations, the first transfer request may be received while the inbound call may be ongoing and the first transfer request may be an out-of-band call signaling message.

In some implementations, routing the inbound call to the first call destination based on the called number further comprises creating a plurality of call legs. In some implementations, the second transfer request may be an out-of-band call signaling message. In some implementations, the method may include dropping at least one connection associated with the inbound call to the first call destination based on the second transfer request. In some implementations, rerouting the inbound call to the second call destination further comprises creating a new outbound call leg to a SIP endpoint. In some implementations, rerouting the inbound call to the second call destination further comprises creating a new outbound call leg to another voice carrier based on least cost routing.

Clause 1. A method for rerouting communication in a unified communications network, the method comprising: receiving an inbound call at a first session border controller; determining, at a redirect server, a redirect number mapped to an inbound call number associated with the inbound call; routing the inbound call to a first call destination based on the redirect number, wherein routing the inbound call to the first call destination comprises: opening a first call connection leg from the first session border controller to a proxy server for the inbound call; opening a second call connection leg from the proxy server to a session border controller for the inbound call, wherein the session border controller can be the first session border controller, a second session border controller, or some other suitable session border controller; and opening a third call connection leg from the second session border controller to a call destination server for an outbound call based on the redirect number to terminate the inbound call at the first call destination; receiving, at a transfer server, a transfer request from a server associated with the first call destination during the inbound call; determining, at the transfer server, a new destination number for transferring the inbound call; transmitting, from the transfer server, an out-of-band transfer request to one or more servers maintaining the inbound call; dropping one or more connections associated with the inbound call to the first call destination based on the out-of-band transfer request; and rerouting, at the first session border controller, the inbound call to a second call destination based on the new destination number identified in the out-of-band transfer request.

Clause 2. The method of clause 1, wherein the transfer request is an out of band signaling message from the inbound call.

Clause 3. The method of clause 1, wherein the one or more connections that are dropped comprise the first call connection leg, second call connection leg, and third call connection leg.

Clause 4. The method of clause 1, wherein the one or more servers comprises the proxy server.

Clause 5. The method of clause 1, wherein the call destination server is a call center server.

Clause 6. The method according to clause 5, wherein the transfer request is automatically sent by the call center server upon receiving the inbound call at the first call destination.

Clause 7. The method of clause 1, wherein the transfer request is automatically sent by the call center server upon receiving an input through an interactive voice response system associated with the call center server.

Clause 8. The method of clause 7, wherein the transfer request is automatically sent by the call center server upon receiving an input from an agent terminal.

Clause 9. The method of clause 8, wherein rerouting the inbound call to the second call destination further comprises creating a new outbound call leg to a session initiation protocol endpoint.

Clause 10. The method of clause 9, wherein rerouting the inbound call to the second call destination further comprises creating a new outbound call leg to another voice carrier based on least cost routing.

Clause 11. A method for rerouting communication in a unified communications network, the method comprising: receiving an inbound call at a first session border controller; routing the inbound call to a first call destination based on a called number associated with the inbound call; receiving, at a transfer server, a first transfer request from a server associated with the first call destination; determining, at the transfer server, a new destination number for transferring the inbound call; transmitting, from the transfer server, a second transfer request to at least one server maintaining the inbound call; and rerouting, at the first session border controller, the inbound call to a second call destination based on the new destination number in the second transfer request.

Clause 12. The method of clause 11, wherein the first call destination comprises a call center server.

Clause 13. The method of clause 11, further comprising determining, at a redirect server, a redirect number mapped to the inbound call number, wherein routing the inbound call is in accordance with the determined redirect number.

Clause 14. The method of clause 11, wherein the first transfer request is received while the inbound call is ongoing and the first transfer request is an out-of-band call signaling message.

Clause 15. The method of clause 11, wherein routing the inbound call to the first call destination based on the called number further comprises creating a plurality of call legs.

Clause 16. The method of clause 11, wherein the second transfer request is an out-of-band call signaling message.

Clause 17. The method of clause 16, further comprising dropping at least one connection associated with the inbound call to the first call destination based on the second transfer request.

Clause 18. The method of clause 11, wherein rerouting the inbound call to the second call destination further comprises creating a new outbound call leg to a SIP endpoint.

Clause 19. The method of clause 11, wherein rerouting the inbound call to the second call destination further comprises creating a new outbound call leg to another voice carrier based on least cost routing.

Clause 20. A system for rerouting communication in a unified communications network comprising: a first session border controller, wherein the first session border controller: receives an inbound call; routes the inbound call to a first call destination based on a called number associated with the inbound call; a transfer server, wherein the transfer server: receives a first transfer request from a server associated with the first call destination; determines a new destination number for transferring the inbound call; transmits a second transfer request to at least one server maintaining the inbound call; and causes the inbound call to be rerouted to a second call destination based on the new destination number.

The present disclosure is not to be limited in terms of the particular implementations described in this disclosure, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the disclosure have been described. Various modifications may be made without departing from the spirit and scope of the disclosure. For example, various forms of the method/process flows shown above may be used, with operations or steps re-ordered, added, or removed. Accordingly, other implementations are within the scope of the following claims.

We claim:

1. A method for rerouting communication in a unified communications network, the method comprising:
   receiving an inbound call at a first session border controller;
   determining, at a redirect server, a redirect number mapped to an inbound call number associated with the inbound call;
   routing the inbound call to a first call destination based on the redirect number, wherein routing the inbound call to the first call destination comprises:
      opening a first call connection leg from the first session border controller to a proxy server for the inbound call;
      opening a second call connection leg from the proxy server to a second session border controller for the inbound call; and
      opening a third call connection leg from the second session border controller to a call destination server for an outbound call based on the redirect number to terminate the inbound call at the first call destination;
   receiving, at a transfer server, a transfer request from a server associated with the first call destination during the inbound call;
   determining, at the transfer server, a new destination number for transferring the inbound call;
   transmitting, from the transfer server, an out-of-band transfer request to one or more servers maintaining the inbound call;

dropping one or more connections associated with the inbound call to the first call destination based on the out-of-band transfer request; and rerouting, at the first session border controller, the inbound call to a second call destination based on the new destination number identified in the out-of-band transfer request.

2. The method of claim 1, wherein the transfer request is an out of band signaling message from the inbound call.

3. The method of claim 1, wherein the one or more connections that are dropped comprise the first call connection leg, second call connection leg, and third call connection leg.

4. The method of claim 1, wherein the one or more servers comprises the proxy server.

5. The method of claim 1, wherein the call destination server is a call center server.

6. The method according to claim 5, wherein the transfer request is automatically sent by the call center server upon receiving the inbound call at the first call destination.

7. The method of claim 1, wherein the transfer request is automatically sent by a call center server upon receiving an input through an interactive voice response system associated with the call center server.

8. The method of claim 7, wherein the transfer request is automatically sent by the call center server upon receiving an input from an agent terminal.

9. The method of claim 8, wherein rerouting the inbound call to the second call destination further comprises creating a new outbound call leg to a session initiation protocol endpoint.

10. The method of claim 9, wherein rerouting the inbound call to the second call destination further comprises creating a new outbound call leg to another voice carrier based on least cost routing.

* * * * *